(No Model.)

A. D. STRONG.
SELF CLEANING CISTERN.

No. 472,488. Patented Apr. 5, 1892.

WITNESSES
Geo. E. Fuchs
Roland Fitzgerald

INVENTOR
A. D. Strong
per Lehmann & Patterson
attys.

UNITED STATES PATENT OFFICE.

ABNER D. STRONG, OF ASHTABULA, OHIO.

SELF-CLEANING CISTERN.

SPECIFICATION forming part of Letters Patent No. 472,488, dated April 5, 1892.

Application filed October 10, 1891. Serial No. 408,300. (No model.)

*To all whom it may concern:*

Be it known that I, ABNER D. STRONG, of Ashtabula, in the county of Ashtabula and State of Ohio, have invented certain new and useful Improvements in Self-Cleaning Cisterns; and I do hereby declare the following to be a full, clear, and exact description of the invention, such as will enable others skilled in the art to which it pertains to make and use it, reference being had to the accompanying drawings, which form part of this specification.

My invention relates to improvements in self-cleaning cisterns; and it consists in the construction and arrangement of parts, which will be fully described hereinafter, and particularly referred to in the claims.

The object of my invention is to so construct a cistern or filter that it will automatically clean itself by means of an overflow-pipe and to cause all of the precipitated sediment to be collected at the end of the overflow-pipe to be carried off with the overflow.

Figure 1:
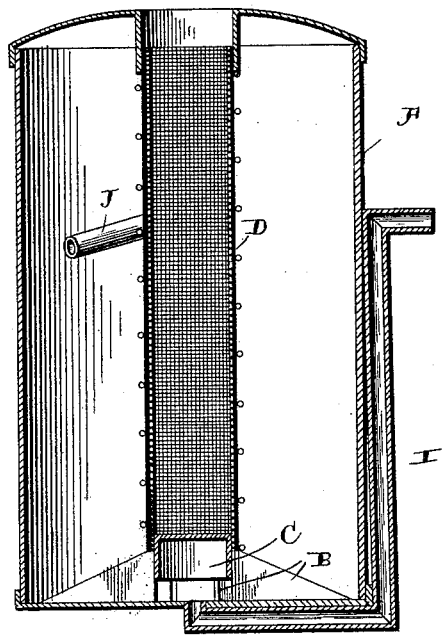
Figure 2:
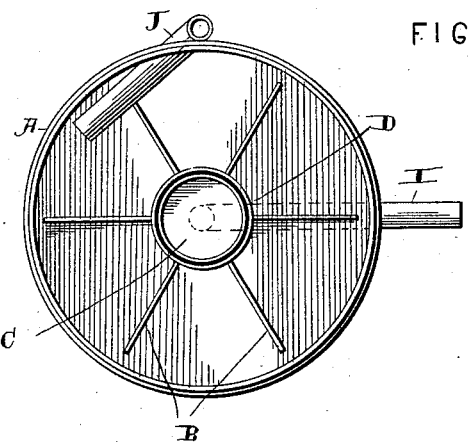
Figure 3:
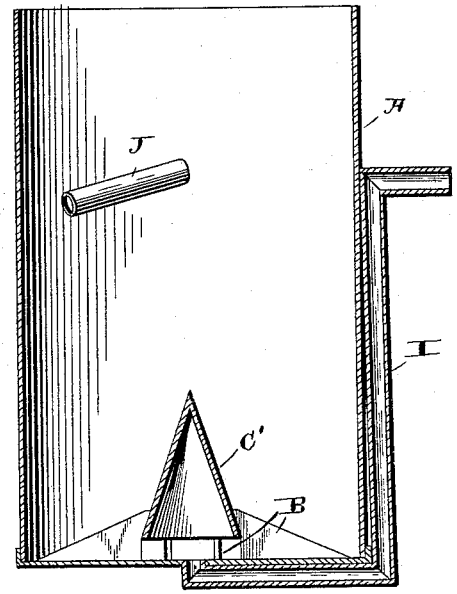

In the drawings, Figure 1 is a vertical section on of a cistern or filter which embodies my invention. Fig. 2 is a plan view of the same with the top removed to show the inner side thereof. Fig. 3 is a vertical section of a cistern without a filter attached.

A indicates a casing, which is either placed entirely below the ground any desired distance, partly above the ground, or entirely above the ground, as convenience may dictate to suit the particular application thereof. This casing can be made of any desired material and of any required size, as will be readily understood. Supported above the bottom of this casing a short distance upon the radially-extending wings or arms B is an inverted cup C, as shown in Fig. 1, or which may be in the shape of a cone, as shown at C' in Fig. 2. As shown in Fig. 1, a filter D, made of any suitable filtering material, rests on a firm support elevated above the bottom of the cistern or casing sufficiently for the overflow-fluid to pass to the lower end of the overflow-pipe, which is under this support and extends as high as convenience or necessity requires. All the water or other fluid passing into this well or filter is thoroughly cleansed of all impurities.

Extending along the outer sides of the casing is an outlet or overflow pipe I, which extends under the casing and up through the bottom thereof directly under the filter, as shown in Fig. 1, or under the cone, as shown in Fig. 2. Extending into the casing or cistern at any desired distance below its upper end is an inlet-pipe J, which extends downward at an angle, as shown, and tangentially to the circumference of the casing. This pipe, instead of being straight at its inner end, however, can be made curved to correspond to the circle of the interior of the casing. The object of having this inlet-pipe extend into the casing in the above-described manner is to cause the water to rotate around in the casing. The fluid passing in this manner causes the water in the casing to rotate around a central vertical line in the cistern and to have the cone and filter as the axis of the said vertical line. The radial arms form pockets around the said cone or cup, and as their upper edges are inclined, as shown, the pockets run off to nothing as the arms approach the inner sides of the casing. By means of this construction the water is made to rotate around a vertical line drawn through the cone or filter, as described, and the precipitated sediment gradually falls and is caught in the pockets formed by the said radial arms. The sediment is in this manner deposited at the mouth of the overflow-pipe and the casing or cistern washed clean when the overflow occurs, as the sediment is carried out thereby. The waste-pipe is here shown as extending up outside of the casing; but it will be readily understood that this pipe may be extended up in the wall of the casing or inside thereof, if desired, and the operation be the same.

The main object is to have the fluid in the casing rotate around a central vertical line or axis, whereby the precipitated sediment is caused to collect at the center of the cistern, and have a pocket at this axial point to catch the sediment as it settles and to connect the overflow-pipe with the bottom of this pocket to carry off the sediment.

By means of the above-described construction I produce a simple and cheap cistern or filter which is automatic in its cleaning, thus requiring no attention on the part of the owner and avoiding the collection of sediment or dirt in the bottom or on the sides thereof.

Having thus described my invention, I claim—

1. In a cistern or filter, an inlet-pipe connected therewith to cause the water therein to rotate around a central vertical line, vertical wings resting upon the bottom of the casing and extending radially from its center to form pockets, and an overflow-pipe having its inlet end at the bottom of the casing to convey the sediment from these pockets, the parts combined substantially as specified.

2. In a cistern, a casing, an inlet-pipe connected therewith to cause the water therein to rotate around a central vertical line, vertical wings at the bottom of the casing and extending radially from its center to form pockets, the wings being inclined from their outer to their inner ends to form pockets that increase in depth toward the center of the casing, and an overflow-pipe connected with the said pockets, substantially as described.

3. In a cistern, a casing, an inlet-pipe extending therein substantially tangentially thereto for causing the water to rotate around a central vertical line, an inverted cup at the bottom of this vertical line, vertical wings extending radially from this cup toward the side walls of the casing and resting upon the bottom, and an overflow-pipe connected with the bottom of the casing below the said cup, all combined as and for the purpose described.

4. In a cistern, a casing, an inlet-pipe connected therewith to cause the water to rotate around a central vertical line, vertical wings extending radially from the center of the bottom of the casing toward the side walls thereof and resting upon the bottom, an inverted cup at the center of the casing and supported upon these wings a short distance above the bottom of the casing, and an overflow-pipe connected with the bottom of the casing below the cup, all combined to operate in the manner described.

In testimony whereof I affix my signature in presence of two witnesses.

ABNER D. STRONG.

Witnesses:
EDWARD P. HALL,
HENRY H. HALL.